United States Patent Office 2,891,076
Patented June 16, 1959

2,891,076

11α,12β-DIMETHYL-Δ$^{4,8(14),13(17)}$-PREG-NATRIENE-3,20-DIONE

Josef Fried, Princeton, N.J., assignor to Olin Mathieson Chemical Corporation, New York, N.Y., a corporation of Virginia No Drawing. Application July 30, 1958
Serial No. 751,859

1 Claim. (Cl. 260—397.3)

This application relates and has for its object the provision of a new physiologically active steriod, which may be represented by the formula

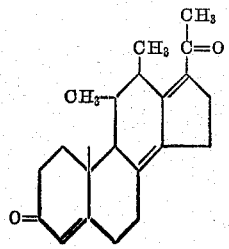

The compound of this invention is prepared, together with 9α-fluoro-12α-methyl-11β-hydroxyprogesterone, by treating 9β,11β-oxido-12α-methylprogesterone with hydrogen fluoride.

The compound of this invention possesses progestational activity, and thus may be used in lieu of known progestational steroids, such as progesterone for example, in the treatment of habitual abortion, being formulated for such administration in the same type of parenteral preparations as progesterone, for example, wtih concentration and/or dosage based on the activity of the particular compound.

The following examples are illustrative of the invention (all temperatures being in centigrade):

EXAMPLE I

9α-fluoro-12α-methyl-11β-hydroxyprogesterone and 11α,12β-dimethyl-Δ$^{4,8(14),13(17)}$-pregnatriene-3,20-dione To a solution of 60 mg. of 9β,11β-oxido-12α-methylprogesterone (preparable as described in the application of Thomas et al., Serial No. 711,779, filed January 29, 1958) in 9.5 ml. of chloroform and 0.5 ml. of ethanol is added at 0° hydrogen fluoride gas until a substantial layer of hydrogen fluoride has formed. The mixture is agitated at 0° for one hour and twenty minutes, neutralized with sodium bicarbonate and the layers separated. The chloroform phase is washed with water, dried over sodium sulfate and the solvent removed in vacuo. The residue is dissolved in 5 ml. of benzene and 10 ml. of hexane and the solution chromatographed over a column of 2.2 gm. of acid-washed alumina. Elution with 550 ml. of benzene-hexene (1:2) furnishes about 30 mg. of 11α,12β-dimethyl - Δ$^{4,8(14)13(17)}$ - pregnatriene - 3,20-dione, which after crystallization from acetone-hexane has the following properties: M. P. about 140–142°; [α]$_D^{23}$+252° (c., 0.33 in chloroform)

$\lambda_{max}^{alc}$ 241 m$\mu$ ($\epsilon$=18,000), 282 m$\mu$ (11,000)

$\lambda_{max}^{Nujol}$ 5.98, 6.02, 6.18, 6.36 $\mu$

*Analysis.*—Calc. for $C_{22}H_{28}O_2$ (324.44) C, 81.44; H, 8.70. Found: C, 81.43; H, 9.01.

Continued elution of the column with 600 ml. of benzene and 400 ml. of benzene-chloroform (9:1) furnishes about 9 mg. of 9α-fluoro-12α-methyl-11β-hydroxyprogesterone, which after recrystallization from acetone-hexane has the following properties: M. P. about 228–229°; [α]$_D^{23}$+147° (c., 0.32 in CHCl$_3$)

$\lambda_{max}^{alc}$ 238 m$\mu$ ($\epsilon$=19,900)

$\lambda_{max}^{Nujol}$ 2.94, 5.90, 6.10, 6.22 $\mu$

*Analysis.*—Calc. for $C_{22}H_{31}O_3F$ (362.46); C, 72.90; H, 8.62. Found: C, 72.97; H, 8.68.

EXAMPLE II

11α,12β-dimethyl-Δ$^{4,8(14),13(17)}$-pregnatriene-3,20β-diol

A solution of 50 mg. of 11α,12β-dimethyl-Δ$^{4,8(14)13(17)}$-pregnatriene-3,20-dione and 50 mg. of sodium borohydride in 20 ml. of methanol is allowed to remain at room temperature for 1.5 hours. After addition of a few drops of glacial acetic acid, water is added and the bulk of the methanol removed in vacuo. The steriod is extracted with chloroform, the chloroform solution dried with sodium sulfate and the solvent evaporated in vacuo. The residual crystals after recrystallization from acetone-hexane have the following properties: M. P. about 171–173°

$\lambda_{max}^{alc}$ 249 m$\mu$ (20,700)

sh 243 (19,300), 250° (13,500)

$\lambda_{max}^{Nujol}$ 3.05 $\mu$ no carbonyl absorption.

The invention may be variously otherwise embodied within the scope of the appended claim.

What is claimed is:

11α,12β - dimethyl-Δ$^{4,8(14),13(17)}$ - pregnatriene-3,20-dione.

No references cited.